Dec. 15, 1931.   A. J. HELVERN   1,836,922
DEMOUNTABLE RIM
Filed March 11, 1929
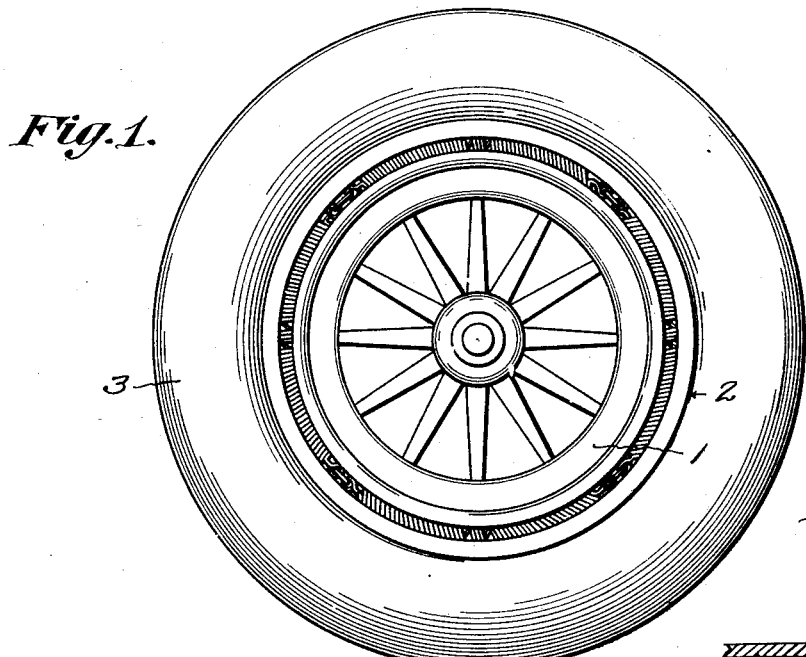
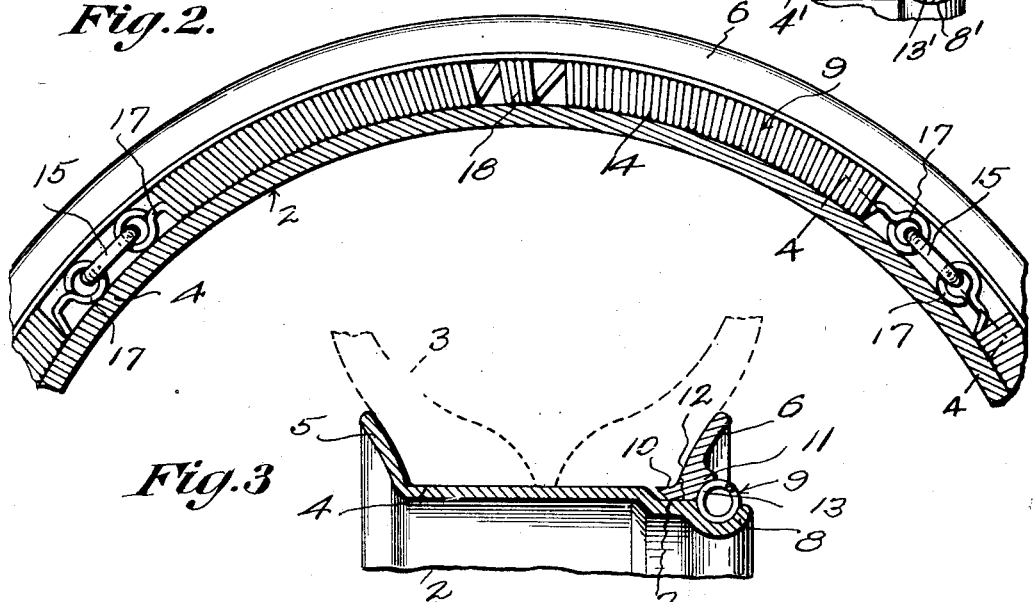
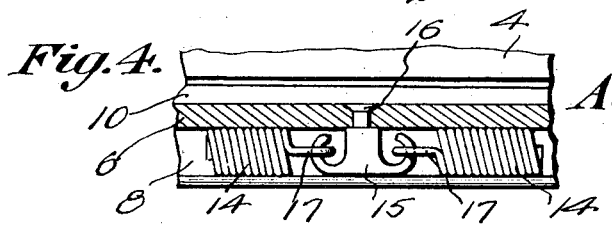
INVENTOR.
Albert J. Helvern,
BY Irving L. Weathman
ATTORNEYS.

Patented Dec. 15, 1931

1,836,922

UNITED STATES PATENT OFFICE

ALBERT J. HELVERN, OF SPRINGFIELD, OHIO

DEMOUNTABLE RIM

Application filed March 11, 1929. Serial No. 346,159.

This invention relates to pneumatic tire carrying rims of the demountable type, and has for one of its objects to provide a rim of this character which, to the end that it may possess greater strength than the split rim, shall embody a continuous rim and continuous flanges.

The invention has for a further object to provide a rim of the character stated which shall embody an outer removable flange and retaining means therefor of such construction as to permit them to be easily and quickly removed and reapplied while the rim is on the wheel whereby to permit the ready removal and re-application of the tire without the necessity of removing the rim from the wheel.

The invention has for a further object to provide a rim of the character stated wherein the locking means shall embody a member removably arranged in arcuate seats in the rim and removable flange and adapted to be retained in said seats by said flange when the tire is inflated and adapted to be released for withdrawal from said seats by a slight inward movement of said flange when the tire is deflated.

The invention has for a further object to provide a rim of the character stated wherein the locking member shall consists of a plurality of coil spring sections connected at their ends to the removable flange in a manner to permit their ready withdrawal from their seats after said flange has been moved slightly inward.

With the foregoing and other objects in view, the nature of which will appear as the description proceeds, the invention consists in the construction, combination and arrangement of parts hereinafter fully described and claimed, and illustrated in the accompanying drawings, wherein:

Figure 1 is a view in elevation illustrating the application of a demountable rim constructed in accordance with my invention;

Figure 2 is a view partly in vertical section and partly in elevation of a fragmentary portion of the rim on an enlarged scale;

Figure 3 is a sectional view taken on a plane extending transversely through the rim;

Figure 4 is a sectional view taken on the line 4—4 of Figure 2, and

Figure 5 is a sectional view illustrating a slightly modified form of the invention.

Referring in detail to the drawings, 1 designates an automobile wheel, 2 designates my demountable rim, and 3 designates a pneumatic tire mounted upon the rim. The rim 2 comprises a web 4, an inner flange 5 and an outer flange 6 which are each of unbroken or continuous formation. The flange 5 is fixed to and preferably formed integrally with the web 4, and the flange 6 is removably associated with the web.

The outer edge portion of the web 4 is offset in the direction of the axis of the rim to provide an annular seat 7 for the flange 6 and an annular seat 8 for a locking or retaining locking member 9 for said flange. The seat 7 is transversely straight, and is located radially beyond the seat 8 so as to permit the ready application and removal of the flange 6. The seat 8 is of arcuate formation transversely and opens out through the circumference of the web 4. The seat 8 receives substantially one-half the circumference of the locking member 9, the remaining portion of the circumference of the locking member projecting radially beyond the seat 7 to establish a locking engagement of the locking member with the flange 6.

The flange 6 is provided at its inner side with an annular shoulder 10 and at its outer side with an annular shoulder 11 which materially increases the width of the wall of the opening of the flange 6 and thus provide a substantial contact between the flange and the seat 7. The width of the seat contacting surface 12 of the flange 8 is less than the width of the seat 7 so as to permit the flange to be moved inwardly and outwardly on the seat. The shoulder 11 has an arcuate face 13 which contacts with the locking member 9 radially and inwardly beyond the seat 8 so as to hold the locking member against withdrawal from said seat.

The locking member 9 consists of a plurality of coil springs 14 which are connected at their ends to the flange 6. The means for connecting the springs 14 to the flange 6 comprises double hooks 15 which are secured, as at 16, to the flange, and eyes 17 carried by the ends of the springs and engaging the hooks. One or more of the convolutions at the transverse center of each spring 14 are spaced from the adjacent convolutions to provide an eye 18, such eyes permitting the springs to be readily withdrawn from the seat 8 through the medium of a hook, screw driver or the like when it is desired to free the flange 6 for removal from the web 4.

In practice, when the tire 3 is inflated, the flange 6 occupies its outermost position on the seat 7, and contacts with the locking member 9 in a manner to positively hold the same in the seat 8, and the locking member positively holds the flange 6 against accidental displacement from the web 4, as will be clearly apparent from Figure 3. When the tire 3 becomes deflated as the result of a puncture, leaky valve, blow out or the like, the flange 6 is freed for inward movement on the seat 7. In other words, the flange 6 is freed for movement from its outer locking position to an inner releasing position. When the flange 6 is in releasing position, the springs may be readily withdrawn from the seat 8 by a screw driver or other tool, and after the withdrawal of the springs the flange and spring may be readily removed from the web 4 and thus permit the removal of the tire 3. As the springs 14 are connected to the flange 6, they will not become displaced on the removal of the flange and will be positioned for engagement with the seat 18 on the reapplication of the flange to the web 4. After the repaired or a new tire has been applied to the web 4, the flange 6 is applied to the seat 7 and moved to its innermost position on its seat. The locking member 9 comprising the springs 14 may be now forced into engagement with the seat 8, and after this has been done the tire 3 is inflated. The inflation of the tire results in the movement of the flange 6 into its outermost or locking position on the seat 7 with the result that the springs are held in the seat 8 and the flange is held on its seat against accidental displacement it of course being understood that the springs are under tension when engaged with the seat 8.

It should be apparent from the foregoing description, taken in connection with the accompanying drawings, that I have provided highly efficient means for securing the removable flange of a rim to the web of the rim, that when the flange is removed the flat tire may be easily and quickly removed and a new one easily and quickly applied, that the ease with which the removable flange may be released, withdrawn, reapplied and again secured in place permits a flat tire to be replaced by a woman or child without removing the rim from the wheel, and that the removable flange locking means is simple and comparatively inexpensive.

While I have described the principle of the invention, together with the structure which I now consider to be the best embodiment thereof, it is to be understood that the structure shown is merely illustrative and that such changes may be made when desired as fall within the scope of the invention as claimed. If desired, the seat 7 may be omitted and the removable flange 6' seated directly on the web 4' as shown in Figure 5. The flange 6' is held in place by means of the spring 13' fitting in the seat 8'.

What I claim is:

1. A tire rim comprising a web provided with an inner fixed flange, an outer removable flange arranged on the web, double hooks carried by the removable flange, coil springs secured at their ends to said hooks, and means carried by the web and engaging the springs to lock the removable flange to the web.

2. A tire rim comprising a web provided with an inner fixed flange, an outer removable flange arranged on the web, anchoring means carried by the removable flange, a coil spring having its ends secured to said anchoring means, and means carried by the web and engaging the spring for locking the removable flange upon the web.

3. A tire rim comprising a web provided with an inner fixed flange, an outer removable flange arranged on said web, anchoring means carried by said removable flange, circumferentially extending elongated elastic means having its ends secured to said anchoring means, and means carried by the web and engaging said elastic means to lock the removable flange upon the web.

In testimony whereof I affix my signature.

ALBERT J. HELVERN.